United States Patent
Curley et al.

(10) Patent No.: US 9,355,119 B2
(45) Date of Patent: May 31, 2016

(54) ALLOCATION OF ABSENT DATA WITHIN FILESYSTEMS

(75) Inventors: Jonathan Curley, Pittsburgh, PA (US); Richard Jernigan, Sewickley, PA (US); Ram Kesavan, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/240,742

(22) Filed: Sep. 22, 2011

(65) Prior Publication Data

US 2013/0080389 A1 Mar. 28, 2013

(51) Int. Cl.
*G06F 17/30* (2006.01)

(52) U.S. Cl.
CPC .... *G06F 17/30215* (2013.01); *G06F 17/30088* (2013.01)

(58) Field of Classification Search
CPC ............ G06F 17/30215; G06F 17/30088
USPC ......................................... 707/639
See application file for complete search history.

(56) References Cited

U.S. PATENT DOCUMENTS

| | | | |
|---|---|---|---|
| 7,672,979 B1 * | 3/2010 | Appellof et al. ............. 707/649 |
| 8,001,307 B1 * | 8/2011 | Gole et al. .................... 710/240 |
| 8,462,014 B1 * | 6/2013 | Kardos et al. ............ 340/870.02 |
| 2004/0054777 A1 * | 3/2004 | Ackaouy et al. ............. 709/225 |
| 2007/0250552 A1 * | 10/2007 | Lango et al. ................. 707/205 |
| 2007/0266056 A1 * | 11/2007 | Stacey et al. ................. 707/203 |
| 2010/0325377 A1 * | 12/2010 | Lango et al. ................. 711/162 |
| 2012/0106366 A1 * | 5/2012 | Gauvin ......................... 370/252 |
| 2013/0342358 A1 * | 12/2013 | Kardos et al. ............ 340/870.02 |

OTHER PUBLICATIONS

International Search Report and Written Opinion issued for PCT Application No. PCT/US2012/055456, dated Jan. 3, 2013, 10 pages.
International Preliminary Report on Patentability for International Patent Application No. PCT/U62012/055456, mailed Mar. 25, 2014, 7 pages.

* cited by examiner

*Primary Examiner* — Apu Mofiz
*Assistant Examiner* — Jared Bibbee
(74) *Attorney, Agent, or Firm* — Nixon Peabody LLP; Khaled Shami

(57) ABSTRACT

Systems and methods which provide an absent allocation technique with respect to absent data of a data structure for which data migration in a time-displaced data migration operation has not completed are disclosed. Through use of absent allocated data block states of an absent allocation technique of embodiments, dependency between source and destination data stores may be broken. An absent allocated data block state of embodiments stored within the data structure provides a suggestive indication that data of a data block of a data structure is absent from the data structure. A corresponding absent allocated data block state of embodiments stored external to the data structure provides a determinative indication that the data of the data block of the data structure is absent from the data structure. The absent data block determinative indictor of embodiments is updated as data continues to be migrated.

19 Claims, 9 Drawing Sheets

ALLOCATION OF ABSENT DATA WITHIN FILESYSTEMS

TECHNICAL FIELD

The present invention relates generally to management of data within filesystems and, more particularly, to allocation of absent data within such filesystems.

BACKGROUND OF THE INVENTION

The creation and storage of digitized data has proliferated in recent years. Accordingly, techniques and mechanisms that facilitate efficient and cost effective storage of large amounts of digital data are common today. For example, a cluster network environment of nodes may be implemented as a data storage system to facilitate the creation, storage, retrieval, and/or processing of digital data. Such a data storage system may be implemented using a variety of storage architectures, such as a network-attached storage (NAS) environment, a storage area network (SAN), a direct-attached storage environment, and combinations thereof. The foregoing data storage systems may comprise one or more data storage devices configured to store digital data within data volumes.

Digital data stored by data storage systems may be frequently migrated within the data storage system and/or between data storage systems, such as by copying, cutting and pasting, replication, backing up and restoring, etc. For example, a user may move files, folders, or even the entire contents of a data volume from one data volume to another data volume. Likewise, a data replication service may replicate the contents of a data volume across nodes within the data storage system. Irrespective of the particular type of data migration performed, migrating large amounts of digital data may consume appreciable amounts of available resources, such as central processing unit (CPU) utilization, processing time, network bandwidth, etc. Moreover, migrating digital data may involve appreciable amounts of time to complete the migration between the source and destination.

In order to avoid poor user experience and other issues associated with latency in the data migration process of a particular data structure, some storage systems have begun implementing techniques which declare the data migration of a data structure complete, and facilitate access to the digital data of the data structure substantially as if the data migration were complete, prior to actual completion of the data migration. For example, data blocks of the data structure may be migrated as a background task and data blocks may be fetched from the source data store as needed on demand of the data consumer. Accordingly, it may appear to users and other consumers of the digital data that the data migration of the data structure has completed very quickly, thereby avoiding poor user experience and other issues associated with data migration latency. Moreover, by implementing such anachronistic or time-displaced data migration techniques, consumption of available resources by the data migration process may be controlled, such as through judicious operation of background data migration operations.

Although providing advantages with respect to user experience, data availability, available resource consumption control, etc., the foregoing time-displaced data migration techniques may present issues with respect to various data management processes. For example, a point-in-time image process may be utilized to create a read-only copy of all the digital data stored by a data volume or other data structure at a particular point in time (e.g., for use in performing digital data backup operations). Such a point-in-time image of a data store which is a destination of a data structure in a time-displaced data migration process that has not completed the data migration may present may result in data management issues. In particular, a paradox may be presented in which an otherwise apparently migrated data structure has portions of the digital data which are not present in the destination data store (referred to herein as "absent data"), but instead remain upon the source data store. Accordingly, a point-in-time image of the digital data stored by the source data store may also be needed in order to provide backup data which facilitates data access matching that of the digital data being backed up (e.g., allowing for absent data blocks being fetched from the source data store as needed on demand of the data consumer). That is, in order to provide the same accessibility with respect to absent data, both the source and destination data stores of a time-displaced data migration would be needed (i.e., the source would need to exist for as long as the destination existed). It can be appreciated that where time-displaced data migration techniques are performed across multiple sources and destinations within a data system, point-in-time images and other processes providing for data at particular points in time may be incomplete without other data sources, or even caught in deadlocked situations with other data sources in the presence of absent data.

BRIEF SUMMARY OF THE INVENTION

The present invention is directed to systems and methods which provide an absent allocation technique with respect to absent data of a data structure for which data migration in a time-displaced data migration operation has not completed. Through use of absent allocated data block states (referred to herein as "AA states") of an absent allocation technique of embodiments herein, the dependency between source and destination data stores is broken with respect to processes providing for data at particular points in time (referred to herein as "point-in-time processes" or "PIT processes"). Accordingly, various PIT processes, such as point-in-time images, point-in-time backup, point-in-time restore, etc., are enabled to function in association with time-displaced data migration operations through the use of absent allocation techniques of embodiments herein.

An absent allocation technique using AA states of embodiments constructs a logical view of the migrated data structure (e.g., file, folder, data volume) in the file system such that absent data resulting from a time-displaced data migration (e.g., data migrated to the destination after a particular point in time) can be subsequently migrated. Using such an absent allocation technique, this subsequently migrated data may be accessed using data of a PIT process from a point in time prior to the subsequent migration (e.g., a point-in-time image taken of a destination data volume prior to completion of migration of a data structure), without altering the data of the PIT process (e.g., the data of the point-in-time image remains read-only and unchanged from the original point-in-time image). For example, in a write anywhere file layout (WAFL) filesystem, the buffer tree and container map (also known as a container file) are logically constructed but left physically absent in providing AA states according to embodiments of the invention. Such logically allocated buffer trees captured by PIT processes (e.g., point-in-time images, point-in-time backup, point-in-time restore, etc.) that are physically absent are used in combination with the container map, which continues to be populated as data is subsequently migrated, according to an absent allocation technique herein thereby breaking the dependency between the source and destination data stores.

AA states as implemented according to embodiments of the invention include simultaneous or contemporaneous use of a plurality of AA state indicators for a particular data block. For example, a suggestive AA state provides a non-determinative indication that data of a data block of a data structure is absent from the data structure. Simultaneously, a determinative AA state provides a determinative indication that the data of the data block of the data structure is absent from the data structure. In accordance with embodiments herein, the suggestive AA state indicator is stored in the data structure (e.g., as part of the aforementioned buffer tree), whereas the determinative AA state indicator is stored external to the data structure (e.g., as part of the aforementioned container map). Accordingly, the determinative AA state indictor of embodiments may be updated as data continues to be migrated, and thus the absent status of data of the data block changes.

In operation according to embodiments of the invention, a data structure is reported as migrated from a source data store to a destination data store within a storage system while data of one or more data blocks of the data structure remain to be migrated from the source data store to the destination data store. AA states of embodiments store absent allocated information for an absent data block of the data structure within the data structure and external to the data structure, wherein the absent data block is a data block of the one or more data blocks remaining to be migrated from the source data store to the destination data store. The absent allocated information stored external to the data structure is updated according to embodiments of the invention when the data of the absent data block is subsequently migrated to the destination data store. Accordingly, when accessing data of the absent data block after the data of the absent data block has been migrated from the source data store to the destination data store, the absent allocated information stored in the data structure indicates that the data of the absent data block is absent from the data structure (e.g., proving a suggestion that data may be absent) and the absent allocated information stored external to the data structure does not indicate that the data of the absent data block is absent from the data structure (e.g., providing a determination that data is not absent). The same accessibility with respect to absent data as was available through the data of the source and destination data stores, without dependency between source and destination data stores and without altering the data of the process providing for data at a particular point in time, is provided with respect to data captured by PIT processes (e.g., point-in-time images, point-in-time backup, point-in-time restore, etc.) when a time-displaced data migration technique results in absent data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
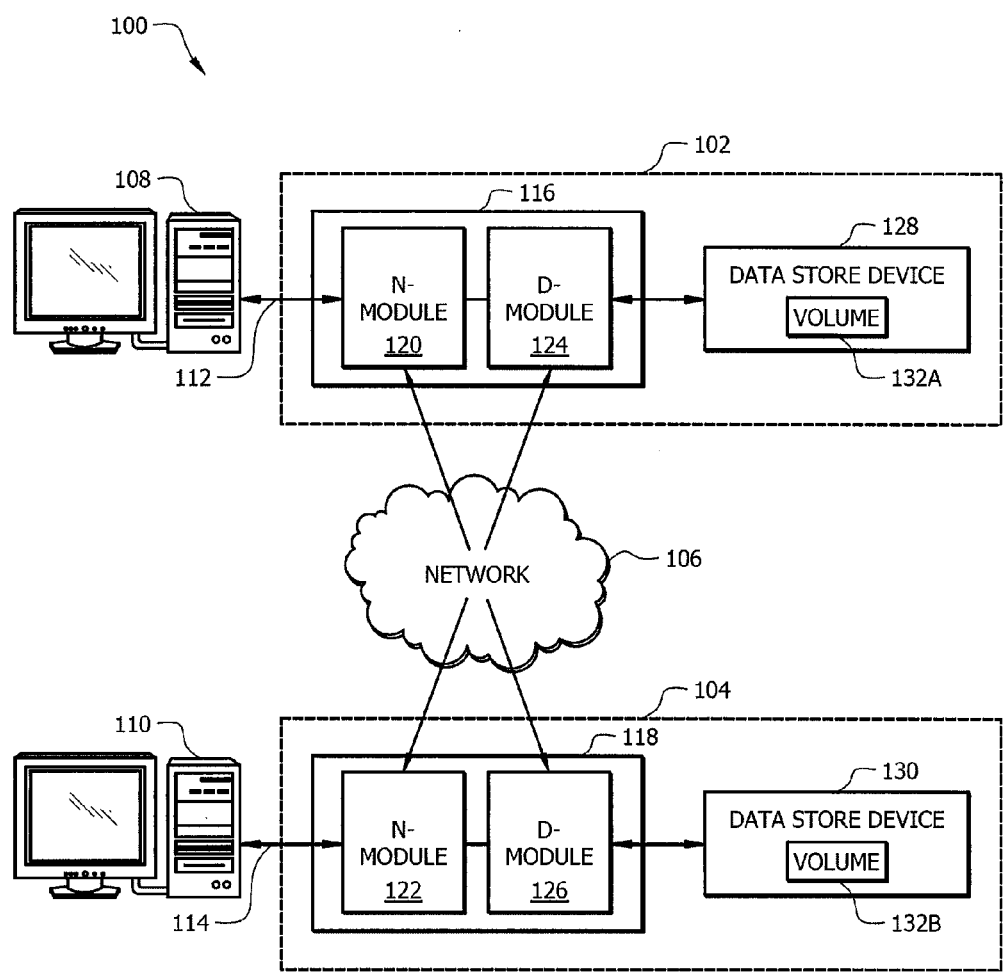
FIG. 1 shows a block diagram of a system adapted to provide AA states for absent data of a data structure according to embodiments of the invention.

FIG. 1 shows a block diagram of a system adapted according to embodiments of the invention to provide AA states for absent data of a data structure for which data migration in a time-displaced data migration operation has not completed. System 100 of FIG. 1 comprises an exemplary clustered network environment in which data storage systems 102 and 104 are coupled via network 106. Data storage systems 102 and 104 of embodiments may comprise one or more modules, components, etc. operable to provide operation as described herein. For example, data storage systems 102 and 104 of the illustrated embodiment comprise nodes 116 and 118 and data store devices 128 and 130, respectively. It should be appreciated that nodes and/or data store devices of data storage systems 102 and 104 may themselves comprise one or more modules, components, etc. Nodes 116 and 118 of the illustrated embodiment comprise network modules (referred to herein as "N-Modules") 120 and 122 and data modules (referred to herein as "D-Modules") 124 and 126, respectively. Data store devices 128 and 130 of the illustrated embodiment comprise volumes 132A and 132B of user and/or other data, respectively.

The modules, components, etc. of data storage systems 102 and 104 may comprise various configurations suitable for providing operation as described herein. For example, nodes 116 and 118 may comprise processor-based systems, such as file server systems, computer appliances, computer workstations, etc. Accordingly, nodes 116 and 118 of embodiments comprise a processor (e.g., central processing unit (CPU), application specific integrated circuit (ASIC), programmable gate array (PGA), etc.), memory (e.g., random access memory (RAM), read only memory (ROM), disk memory, optical memory, flash memory, etc.), and suitable input/output circuitry (e.g., network interface card (NIC), wireless network interface, display, keyboard, data bus, etc.). The foregoing processor-based systems may operate under control of an instruction set (e.g., software, firmware, applet, code, etc.) providing operation as described herein.

Data store devices 128 and 130 may, for example, comprise disk memory, flash memory, optical memory, and/or other suitable computer readable media. Data modules 124 and 130 of nodes 116 and 118 may be adapted to communicate with data store devices 128 and 130 according to a storage area network (SAN) protocol (e.g., small computer system interface (SCSI), fiber channel protocol (FCP), INFINIBAND, etc.) and thus data store devices 128 and 130 may appear a locally attached resources to the operating system. That is, as seen from an operating system on nodes 116 and 118, data store devices 128 and 130 may appear as locally attached to the operating system. In this manner, nodes 116 and 118 may access data blocks through the operating system, rather than expressly requesting abstract files.

Network modules 120 and 122 may be configured to allow nodes 116 and 118 to connect with client systems, such as clients 108 and 110 over network connections 112 and 114, to allow the clients to access data stored in data storage systems 102 and 104. Moreover, network modules 120 and 122 may provide connections with one or more other components of system 100, such as through network 106. For example, network module 120 of node 116 may access data store device 130 via communication via network 106 and data module 126 of node, 118. The foregoing operation provides a distributed storage system configuration for system 100.

Clients 108 and 110 of embodiments comprise a processor (e.g., CPU, ASIC, PGA, etc.), memory (e.g., RAM, ROM, disk memory, optical memory, flash memory, etc.), and suitable input/output circuitry (e.g., NIC, wireless network interface, display, keyboard, data bus, etc.). The foregoing processor-based systems may operate under control of an instruction set (e.g., software, firmware, applet, code, etc.) providing operation as described herein.

Network 106 may comprise various forms of communication infrastructure, such as a SAN, the Internet, the public switched telephone network (PSTN), a local area network (LAN), a metropolitan area network (MAN), a wide area network (WAN), a wireless network (e.g., a cellular communication network, a wireless LAN, etc.), and/or the like. Network 106, or a portion thereof may provide infrastructure of network connections 112 and 114 or, alternatively, network connections 112 and/or 114 may be provided by network infrastructure separate from network 106, wherein such separate network infrastructure may itself comprise a SAN, the Internet, the PSTN, a LAN, a MAN, a WAN, a wireless network, and/or the like.

As can be appreciated from the foregoing, system 100 provides a data storage system in which various digital data may be created, maintained, modified, and accessed (referred to collectively as data management). A logical mapping scheme providing logical data block mapping information, stored within and stored without the data structures, may be utilized by system 100 in providing such data management. For example, a filesystem implemented by data store devices 128 and 130 may implement a logical data block allocation technique, exemplary embodiments of which are discussed below with reference to FIGS. 2 and 3, for creating, maintaining, modifying, and accessing data structures.

In one embodiment, data store devices 128 and 130 comprise volumes (shown as volumes 132A and 132B respectively), which is an implementation of storage of information onto disk drives, disk arrays, and/or other data stores (e.g., flash memory) as a file-system for data, for example. Volumes can span a portion of a data store, a collection of data stores, or portions of data stores, for example, and typically define an overall logical arrangement of file storage on data store space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the exemplary configuration of system 100, clients 108 and 110 can utilize data storage systems 102 and 104 to store and retrieve data from volumes 132. In such an embodiment, for example, client 108 can send data packets to N-module 120 in node 116 within data storage system 102. Node 116 can forward the data to data store device 128 using D-module 124, where data store device 128 comprises volume 132A. In this way, in this example, the client can access storage volume 132A, to store and/or retrieve data, using data storage system 102 connected by network connection 112. Further, in this embodiment, client 110 can exchange data with N-module 122 in node 118 within data storage system 104 (e.g., which may be remote from data storage system 102). Node 118 can forward the data to data store device 130 using D-module 126, thereby accessing volume 132B associated with the data storage device 130.

The foregoing data store devices each comprise a plurality of data blocks, according to embodiments herein, which may be used to provide various logical and/or physical storage containers, such as files, container files holding volumes, aggregates, virtual disks, etc. Such logical and physical storage containers may be defined using an array of blocks indexed or mapped either logically or physically by the filesystem using the appropriate type of block number. For example, a file may be indexed by file block numbers (FBNs), a container file by virtual block numbers (VBNs), an aggregate by physical block numbers (PBNs), and disks by disk block numbers (DBNs). To translate an FBN to a disk block, a filesystem (e.g., a WAFL filesystem) may use several steps, such as to translate the FBN to a VBN, to translate the VBN to a PBN, and then to translate the PBN to a DBN. Storage containers of various attributes may be defined and utilized using such logical and physical mapping techniques. For example, volumes such as volumes 132A and 132B may be defined to comprise aggregates (e.g., a traditional volume) and/or flexible volumes (e.g., volumes built on top of traditional volumes as a form of virtualization) using such logical and physical data block mapping techniques.

Figure 2:
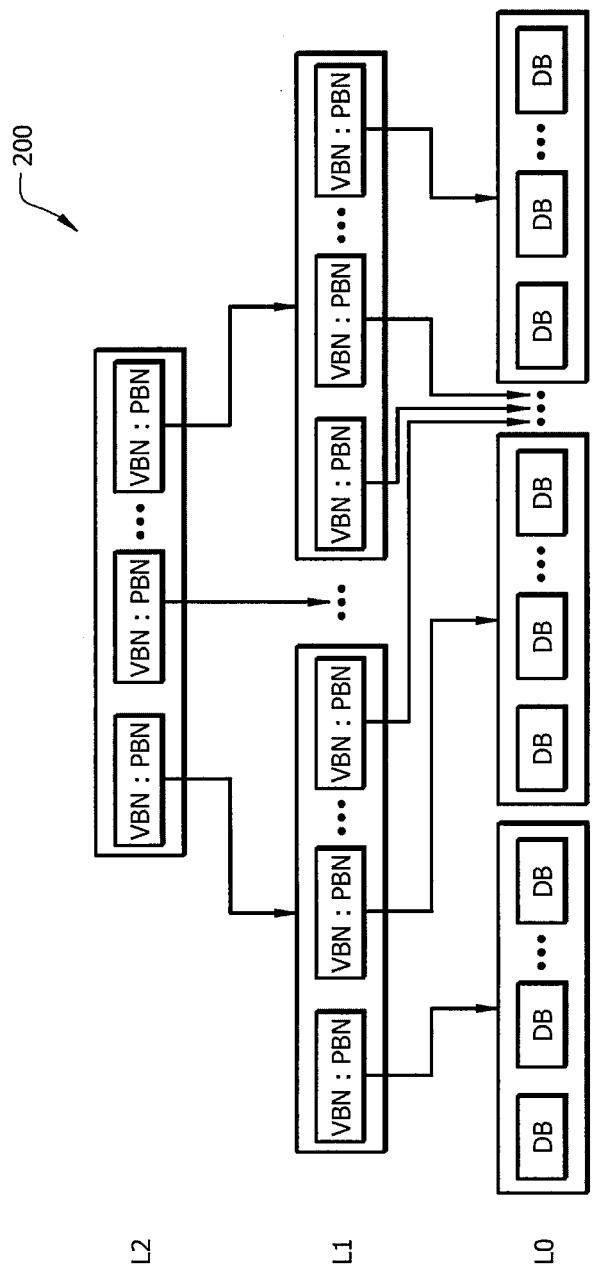
FIG. 2 shows a hierarchical logical mapping which may be stored within a data structure and utilized in providing AA state information according to embodiments of the invention.

FIG. 2 shows buffer tree 200 providing hierarchical logical mapping information of a logical mapping technique as is utilized according to embodiments of the invention. The logical mapping information of buffer tree 200 may be stored within a data structure and utilized in providing AA state information herein. Using a hierarchical logical mapping scheme, such as that of FIG. 2, data structures of arbitrarily large size may be accommodated.

It should be appreciated that the hierarchical logical mapping of buffer tree 200 provides indirect data block mapping using a plurality of levels (shown as levels L0-L2). Data blocks of level L0 comprise the ultimate data (e.g., user data, application data, etc.) and thus provide a data level. Levels L1 and L2 of buffer tree 200 comprise indirect blocks that provide information with respect to other data blocks, wherein data blocks of level L2 provide information identifying data blocks of level L1 and data blocks of level L1 provide information identifying data blocks of level L0. The illustrated embodiment of buffer tree 200 comprises a configuration in which data blocks of the indirect levels (levels L1 and L2) comprise both logical data block identification information (shown as virtual block numbers (VBNs)) and their corresponding physical data block identification information (shown as physical block numbers (PBNs)). That is, in the illustrated embodiment, each of levels L2 and L1 have both a VBN and PBN. This format, referred to as dual indirects due to there being dual block numbers in indirect blocks, is a performance optimization implemented according to embodiments herein.

Alternative embodiments may be provided in which the file buffer trees store VBNs without their corresponding PBNs. However, a consequence of such an embodiment is that, for every VBN, the system would have to look up the PBN in another map (e.g., a container map). The illustrated embodiment of buffer tree 200 avoids this significant amount of work by essentially caching the PBN in the buffer tree itself by storing both numbers. Irrespective of the particular performance optimization techniques implemented, absent allocated states implemented according to embodiments of the invention take advantage of the layer of indirection of a logical mapping to implement on-demand time-displaced semantics.

Figure 3:
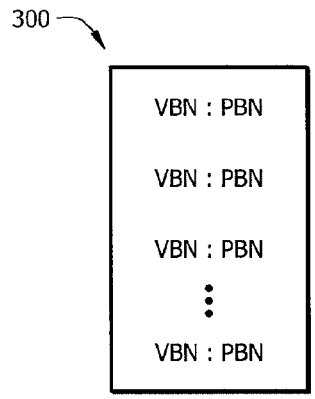
FIG. 3 shows a logical mapping which may be stored without a data structure and utilized in providing AA state information according to embodiments of the invention.

FIG. 3 shows container map 300 providing logical mapping information which may be stored without, or outside of, a data structure and utilized in providing AA state information according to embodiments of the invention. Although container map 300 is a buffer tree, similar to buffer tree 200, container map 300 of embodiments provides a single indirect format due to there being single block numbers in indirect blocks (in contrast to the dual indirect format of buffer tree 200). It should be appreciated that the logical data block identification information and physical data block identification information of container map 300 associated with a particular data structure provides essentially the same logical mapping information as the logical data block identification information and physical data block identification information of buffer tree 200, albeit in a different form. Container map 300 of embodiments is a file and represents data in blocks from FBN 0 to FBN N, wherein FBN N of the container map corresponds to VBN N of the volume contained inside the container.

It should be appreciated that both buffer tree 200 and container map 300 may be provided according to embodiments, although each provides data block mapping with respect to a same data structure, because there are 2 objects: one object being the container map inside the flexible volume aggregate and the other object being the actual user files inside the flexible volume. Each of the blocks in a user file's buffer tree may thus have 3 locations according to embodiments (e.g., the FBN in the file's buffer tree, the location in the flexible volume's buffer tree (the FBN of the container map) and a PBN (the block number in the aggregate).

Data management functionality provided by system 100 using buffer tree 200 and container map 300 according to embodiments of the invention includes time-displaced data migration. Accordingly, system 100 may operate to declare that the data migration of a data structure is complete prior to actual completion of the data migration. For example, a user of client 108 may initiate migration of a data structure (e.g., a file, folder, data volume, etc.) from data store device 130 to data store device 128. The particular data structure may comprise a relatively large amount of digital data (e.g., 200 GB) and thus it's migration from the source (data store device 130) to the destination (data store device 128) may take an appreciable amount of time (e.g., tens or even hundreds of minutes). System 100 may thus implement a time-displaced data migration technique to declare the data structure migrated almost immediately after the initiation of the migration process by the user, although data blocks of the data structure may in fact remain to be migrated (e.g., in a background process which has not yet completed). Despite there being data of the data structure absent from the destination, operation of the time-displaced data migration technique by system 100 of embodiments facilitates access to the data of the data structure as if all data blocks of the data structure were present at the destination.

Operation of the foregoing time-displaced data migration techniques, wherein data is absent with respect to a file structure at a destination for some period of time, may present issues with respect to various data management processes, such as PIT processes. Such PIT processes may comprise processes such as point-in-time images (e.g., SNAPSHOT functionality available from NetApp, Inc.), point-in-time backup (e.g., SNAPVAULT functionality available from NetApp, Inc.), point-in-time restore (e.g., SNAPRESTORE functionality available from NetApp, Inc.), etc. For example, in order to provide the same accessibility with respect to absent data using data captured using a PIT process, both the source and destination data stores of a time-displaced data migration may be needed to provide access to data absent at the destination. Implementation of absent allocation techniques according to embodiments of the invention, however, break the dependency between source and destination data stores with respect to data captured using PIT processes for data structures partially migrated using a time-displaced data migration technique.

Figure 4:
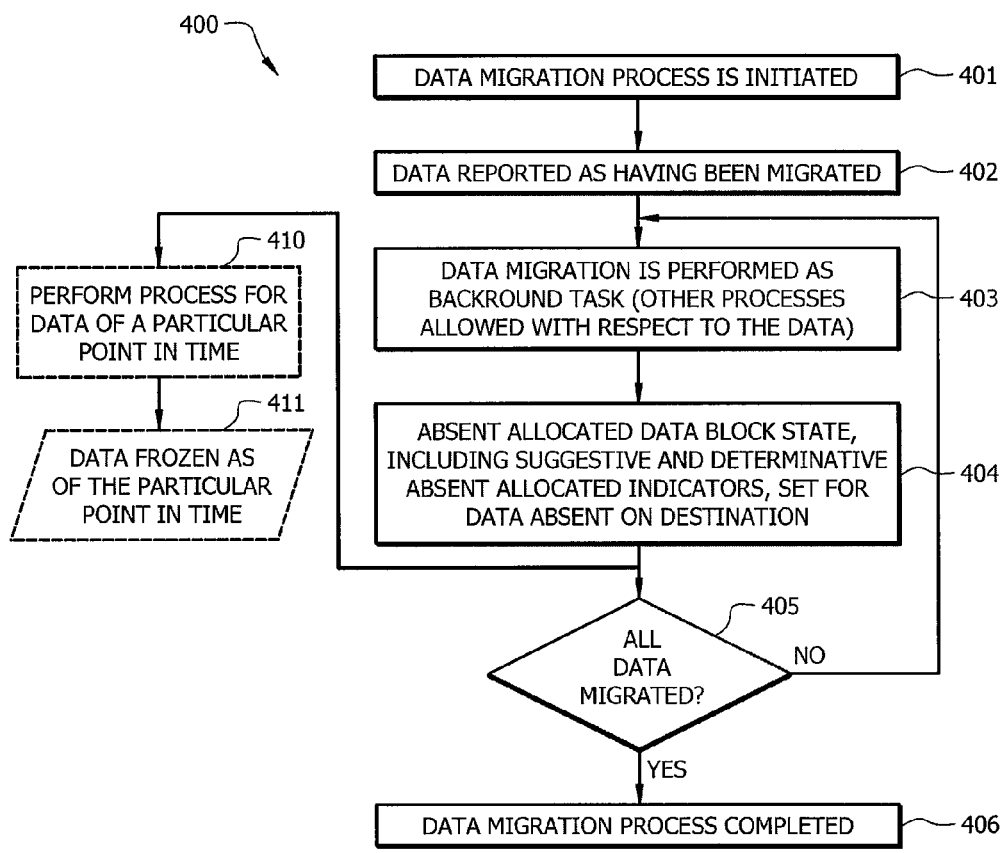
FIG. 4 shows a flow diagram operable to provide AA states for absent data of a data structure according to embodiments of the invention.

FIG. 4 shows flow 400 providing operation of system 100 to provide AA states for absent data of a data structure for which data migration in a time-displaced data migration operation has not completed according to embodiments of the invention. It should be appreciated that flow 400 illustrated in FIG. 4 may be implemented in software whereby elements of embodiments of the present invention are essentially code segments operable upon a processor-based or computer system (e.g., clients 108, 110 and/or data storage systems 102, 104) to perform tasks as described herein. The program or code segments can be stored in a computer readable medium (e.g., RAM, ROM, disk memory, optical memory, flash memory, etc.).

In operation according to the illustrated embodiment, a data migration process is initiated at block 401. The data migration process may, for example, comprise copying, cutting, pasting, replication, backing up, and/or restoring digital data. Such data migration may be initiated by a user (e.g., a user of client 108 or 110), another process (e.g., a backup process or a data mirroring process), etc. The data being migrated comprises a data structure (e.g., file, folder, data volume, etc.) stored by one or more data store of system 100 (source data store or location) to be written to one or more data store of system 100 (destination data store or location). It should be appreciated that such migration may comprise a source and destination which are part of the same data store device.

At block 402 of the illustrated embodiment, system 100 reports the data as having been migrated from the source (e.g., data store device 130) to the destination (e.g., data store device 128). However, data of one or more data blocks of the data structure remain to be moved from the source data store to the destination data store. Accordingly, a time-displaced data migration technique is provided wherein it appears as if the data was migrated more quickly than the data was in fact migrated.

In operation according to the embodiment illustrated in FIG. 4, data migration is performed as a background task by system 100, as represented by block 403. For example, as resource utilization, quality of service parameters, bandwidth availability, etc. permits, data blocks of the data structure to be migrated may be migrated from the source to the destination. Other processes, such as access to the migrated data and other data, are preferably accommodated by system 100 during the foregoing migration of the data. Accordingly, various other processes may be performed asynchronously with respect to the data migration at block 403.

At block 404, while performing data migration, AA states are set for data of the file structure being migrated which is absent on the destination at that particular point in the migration process. The AA states of embodiments store suggestive absent allocated information for an absent data block of the data structure within the data structure (e.g., as part of buffer tree 200) and determinative absent allocated information for an absent data block of the data structure external to the data structure (e.g., as part of container map 300). Suggestive absent allocated information provides a non-authoritative or non-determinative indication (i.e., a rebuttable suggestion) that the data of a particular data block may not be present on the destination. Determinative absent allocated information provides an authoritative or determinative indication (e.g., a final determination) that the data of a particular data block is not present on the destination.

AA states may comprise a plurality of states indicated in a variety of ways. For example, a first state (e.g., an absent allocated state) may be indicated through use of a predetermined code entered as the PBN (e.g., at level 0 (L0) of a hierarchical logical mapping) for an absent allocated data block. The absent allocated state may be represented by a particular reserved PBN or other information unlikely to be confused with an actual, valid PBN. Alternatively, this state may be indicated through the use of data stored in or in association with a PBN assigned to an absent allocated data block (e.g., particular metadata to indicate absent allocated or data stored within the data block unlikely to be confused with actual, valid data). A second state (e.g., a present state) may be indicated for a previously absent allocated data block through the use of an actual, valid PBN and/or data stored thereby. For example, the present state may be represented by the lack of a particular PBN, metadata, or other data used to indicate the absent allocated state.

States in addition to or in the alternative to the aforementioned absent allocated state and present state may be provided by embodiments of the invention. For example, a third state (e.g., an absent state) may be indicated through the use of a predetermined code entered as the PBN for an absent data block. The absent state may be represented by a different reserved PBN than that used for the aforementioned absent allocated state. Such an absent state may be a precursor to an absent allocated state. For example, a data block may be denoted as absent prior to allocation of a level 0 (L0) block for an absent data block in a logical view of the migrated data structure.

In operation according to embodiments of the invention at block 404, the foregoing AA states are provided as part of a data cleaning process performed by system 100. For example, as the dirtied data of the buffer is committed to the destination data store through the cleaning process, data blocks of the data structure being migrated which are not present in the buffer and which have not already been committed to the destination data store have AA states of absent allocated set with respect thereto. That is, logical blocks are allocated in the logical view of the migrated data structure for data blocks of the data structure being migrated which are not present when the cleaning process is performed. Logical blocks may be provided in buffer tree 200 for each of the absent data blocks, wherein these logical blocks comprise AA state information (e.g., a respective VBN and an absent allocated code instead of a PBN at level 0 (L0)). Similarly, logical blocks may be provided in container map 300 for each of the absent data blocks, wherein these logical blocks comprise AA state information (e.g., a respective VBN and an absent allocated code instead of a PBN).

From the foregoing, it can be appreciated that absent allocation techniques herein may be implemented using the existing virtual and physical block number spaces provided by various data structures (e.g., flexible volumes). In particular, such an absent allocation process may proceed by selecting a VBN for an absent data block, whereas an actual or non-reserved PBN is not selected at absent allocation time. Instead absent allocation information may be written into the indirect block of a buffer file for the absent data block. The container map for the data structure, which maps VBNs to PBNs, present in the parent aggregate may correspondingly be updated to include absent allocation information at the corresponding level 1 (L1) buffer index for the VBN. Accordingly, the level 0 (L0) PBN for an absent allocated data block of embodiments of the invention does not contain valid data while the data block is absent allocated, although it may be later filled with valid data, such as using a fetch and fill process on-demand.

Having provided AA state information for data blocks of the data structure being migrated which is absent on the destination, processing according to flow 400 of the illustrated embodiment proceeds to block 405. At block 405 a determination is made as to whether all the data of the file structure being migrated has been migrated to the destination. If all the data has been migrated, processing according to the illustrated embodiment proceeds to block 406 wherein the data migration process concludes. However, if data remains to be migrated, processing according to the illustrated embodiment returns to block 403 wherein data migration is continued.

It should be appreciated that as additional data is migrated to the destination, whether by continued background data migration processing or by other means (e.g., as the result of a data fetch in response to a user accessing the time-displaced data structure at the destination), AA state information provided at block 404 is updated. For example, the AA state information of logical blocks provided in buffer tree 200 for the absent data blocks which have now been migrated to the destination may be updated (e.g., a PBN provided to replace the aforementioned absent allocated code). Similarly, the AA state information of logical blocks provided in container map 300 for the absent data blocks which have now been migrated to the destination may be updated (e.g., a PBN provided to replace the aforementioned absent allocated code).

In understanding the use of the AA states of embodiments of the invention it is helpful to remember that absent data block information is stored in the migrated data structure (e.g., buffer tree 200) and external to the migrated data structure (e.g., container map 300). It is likewise helpful to remember that other processes are allowed to be performed with respect to the data being migrated. Accordingly, block 410 of the embodiment illustrated in FIG. 4 shows a PIT process (e.g., point-in-time image) being performed asynchronously with respect to the data migration and absent allocation processing of flow 400. The PIT process of the illustrated embodiment provides data frozen as of the particular point in time (frozen data 411). Accordingly, frozen data 411 may comprise an incomplete data structure (e.g., have absent data). Moreover, the data structure captured by frozen data 411 comprises stored absent allocated data block information (e.g., buffer tree 200) as of the particular point in time. Accordingly, although operation provided by flow 400 may update both the absent data block information stored in the migrated data structure and external to the migrated data structure as discussed above, the absent data block information stored in the data structure as captured by frozen data 411 is not updated. Nevertheless, the formerly absent data blocks may continue to be migrated from the source to the destination (and thus removed from the source) after frozen data 411 was captured. The aforementioned AA states of embodiments of the invention accommodate this absent data paradox through the use of suggestive and determinative absent allocated data block information.

For example, various PIT processes may be performed after the AA states have been initially set for blocks of a data structure. Thereafter, the suggestive and determinative AA states are referenced to mitigate issues associated with the later migration of absent data. In particular, when absent allocated blocks are accessed inside a data volume after a PIT process data capture providing frozen data, the data blocks can be fetched and filled from the source without having to modify the data volume image captured by the PIT process. This is because the AA state information in the data volume buffer tree of embodiments is only treated as a hint or suggestion as to the absent state of the data block. As discussed in further detail below with reference to FIG. 5, it is the AA state information in the container map file of embodiments which authoritatively or deterministically indicates whether a data block as been fetched and filled subsequent to the capture of the frozen data or not (i.e., remains absent).

Figure 5:
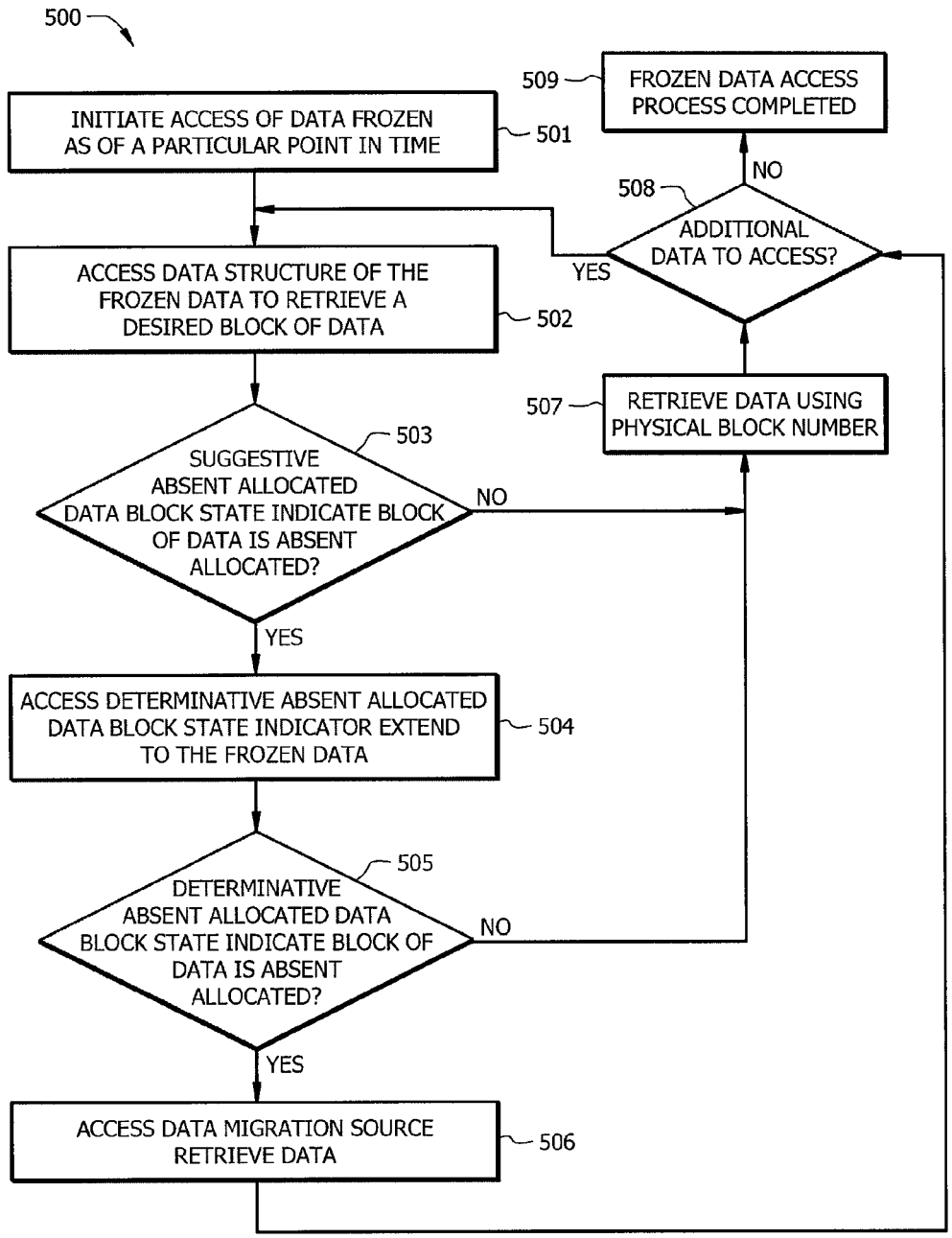
FIG. 5 shows a flow diagram operable to provide access to data frozen as of a particular point in time using AA states according to embodiments of the invention.

FIG. 5 shows flow 500 illustrating operation of system 100 providing access to frozen data 411 using AA states herein to accommodate the aforementioned absent data paradox. According, at block 501 of the illustrated embodiment, access of frozen data 411 is initiated. Such access to the data may, for example, comprise a PIT process (e.g., a point-in-time restore of data blocks), one or more data fetch operations, etc.

At block 502 shown in flow 500 the data structure of frozen data 411 is accessed to retrieve a desired block of data. For example, the data access process initiated may serially access the data blocks (e.g., according to their logical and/or physical mapping) in a process to return a portion of the data stored by system 100 to its state at the particular point in time data was captured by the PIT process. Likewise, the data access process initiated may access particular data blocks (e.g., data blocks relevant to an operation or a request by a user) in a process to provide some portion of data in its state at the particular point in time data was captured by the PIT process.

In operation according to embodiments of the invention, accessing the data structure at block 502 comprises accessing logical mapping information (e.g., buffer tree 200) which is stored within the data structure captured as part of frozen data 411. As discussed above, such logical mapping information is adapted according to embodiments herein to provide mapping of logical data block information to AA state information. Such AA state information of embodiments may indicate an absent allocated state for data blocks which had not been migrated, and thus were absent at the destination, at the particular point in time frozen data 411 was captured. Alternatively, the AA state information may provide mapping of logical data block information to physical data block information for data blocks which had been migrated, and thus were present at the destination, at the particular point in time frozen data 411 was captured. Because the AA state information stored within the data structure captured as part of frozen data 411 is not updated after the particular point in time of its capture, it does not reflect subsequent migration of data blocks. Accordingly, embodiments of the invention use this AA state information as a suggestive indication (i.e., a non-authoritative or non-determinative indication) of the absent allocated state of the data block. That is, the AA state stored within the data structure (e.g., as part of the aforementioned buffer tree) of embodiments of the invention is used to provide a suggestive indication that data of a data block of a data structure is absent from the data structure.

At block 503 of the illustrated embodiment a determination is made as to whether the suggestive AA state information for the data block being accessed as stored by the data structure of the frozen data indicates that the data block is absent. If not, the data block had been migrated, and thus was present at the destination, at the particular point in time frozen data 411 was captured, and thus was captured by as part of this frozen data. Accordingly, if the suggestive AA state information for the data block being accessed does not indicate that the data block is absent, processing according to flow 500 proceeds to block 507 wherein the data block is retrieved (e.g., using the VBN and PBN mapping information of buffer tree 200 and/or container map 300) and thence to block 508 wherein it is determined whether additional data blocks are to be accessed for branching to return to access additional data blocks (block 502) or to conclude the data block access processing (block 509).

If, however, the data block had not been migrated, and thus was not present at the destination, at the particular point in time frozen data 411 was captured, and thus was not captured by as part of the frozen data the suggestive AA state information will indicate that the data block is absent. As described above, the AA state information stored within the data structure captured as part of frozen data 411 is not updated after the particular point in time of its capture, and thus does not reflect subsequent migration of data blocks. Accordingly, if the suggestive AA state information for the data block being accessed indicates that the data block is absent, processing according to flow 500 proceeds to block 504 for a determinative indication of the absent state of the data block.

At block 504 of the illustrated embodiment logical mapping information which is stored external to the data structure captured as part of frozen data 411 (e.g., container map 300) is accessed. As discussed above, such logical mapping information is adapted according to embodiments herein to provide mapping of logical data block information to AA state information. Such AA state information of embodiments may indicate an absent allocated state for data blocks which had not been migrated, and thus were absent at the destination, at the particular point in time frozen data 411 was captured. Alternatively, the AA state information may provide mapping of logical data block information to physical data block information for data blocks which had been migrated, and thus were present at the destination, at the particular point in time frozen data 411 was captured. However, unlike the suggestive AA state information stored in the data structure as captured by the frozen data, the absent allocated information for the absent data block stored external to the data structure is updated according to embodiments of the invention when the data of the absent data block is subsequently migrated to the destination. Accordingly, the AA state information of the logical mapping information stored externally to the frozen data (e.g., as part of the aforementioned container map) is utilized according to the illustrated embodiment to provide a determinative indication (e.g., an authoritative indication or final determination) that the data of the data block of the data structure is absent from the data structure.

At block 505 of the illustrated embodiment a determination is made as to whether the determinative AA state information for the data block being accessed as stored by the data structure of the frozen data indicates that the data block is absent. If not, the data block had been migrated subsequent to the point in time frozen data 411 was captured, and thus is present at the destination. Accordingly, if the determinative AA state information for the data block being accessed does not indicate that the data block is absent, processing according to flow 500 proceeds to block 507 wherein the data block is retrieved (e.g., using the VBN and PBN mapping information of container map 300) and thence to block 508 wherein it is determined whether additional data blocks are to be accessed for branching to return to access additional data blocks (block 502) or to conclude the data block access processing (block 509).

If, however, the data block had not been migrated, and thus remains absent at the destination, the determinative AA state information will indicate that the data block is absent. As described above, the AA state information stored without the data structure captured as part of frozen data 411 is updated after the particular point in time of its capture, and thus reflects subsequent migration of data blocks. Accordingly, if the determinative AA state information for the data block being accessed indicates that the data block is absent, processing according to flow 500 proceeds to block 506 for accessing the data block from the migration source and thence to block 508 wherein it is determined whether additional data blocks are to be accessed for branching to return to access additional data blocks (block 502) or to conclude the data block access processing (block 509).

From the foregoing it can be appreciated that, if an AA state of absent allocated is present in both the logical mapping stored within the data structure (e.g., the buffer tree) and the corresponding logical mapping stored without the data structure (e.g., the container map) then flow 500 of the illustrated embodiment proceeds with fetching the data block from the source (block 506). In operation according to embodiments, a fetch reads the data block from the source and then initiates a fill (writes the data block) at the destination. Absent allocated fills of embodiments write to the externally stored logical mapping (e.g., container map) and then awaken client requests that were waiting for the data block. The awoken client request of embodiments will still see the AA state absent allocated hint in the logical mapping stored in the data structure (e.g., buffer tree) but when it checks the logical mapping stored external to the data structure (e.g., container map) it will find the block and complete successfully. The foregoing fetch and fill of absent allocated blocks proceeds without modifying the data structure captured in the frozen data, although read only images inside the captured data structure (e.g. point-in-time images) can be filled subsequent to the capture of the frozen data (e.g., on demand).

The foregoing absent allocation techniques, using AA states of embodiments, construct a logical view of the migrated data structure (e.g., file, folder, data volume) in the file system such that absent data resulting from a time-displaced data migration can be subsequently migrated and the migrated data accessed by a PIT process prior to its migration (e.g., a point-in-time image taken of a destination data volume prior to completion of migration of a data structure), without altering the data of the PIT process (e.g., the data of a point-in-time image remains read-only and unchanged from the original point-in-time image). For example, through embodiments going outside the data structure to determine if particular data blocks have been filled from the source or not, an orthogonal state is created. Such an orthogonal state is orthogonal to various other processes which may be performed asynchronously with respect to the data migration process (e.g., point-in-time images) that are created with respect to the data structure. Such orthogonality allows operation herein to create point-in-time images on a volume, for example, and the absent blocks to be subsequently filled in on the volume at leisure. The AA state that gets captured in the foregoing point-in-time image according to embodiments is only a hint or suggestion, not authoritative or determinative, regarding the absentness of a data block. For example, the absent allocated information in the buffer tree PBN serves as a hint of absentness that is authoritatively answered by a subsequent check of the container map according to embodiments of the invention. If both indicate absent allocated, then a fetch from the source may be performed and fills may be done to the container map. Accordingly, absent allocation techniques as described above enable various processes, including a set of on-demand operations, to be implemented in an existing WAFL ecosystem while maintaining a very high level of compatibility with existing features (e.g., features built upon point-in-time images, etc.).

Having described concepts of the present invention with reference to the high level block and flow diagrams above, operation according embodiments of the invention is described with reference to particular filesystem configuration aspects in the ladder diagrams below. It should be appreciated that the details of the particular filesystem configuration aspects referenced below are provided to aid the reader in better understanding concepts of the present invention and, although embodiments of the invention may incorporate such aspects, the concepts herein are not so limited.

The ladder diagrams of FIGS. 6-10 show various operational cases of a configuration of system 100 providing absent allocation techniques according to embodiments herein in an exemplary WAFL filesystem. It should be appreciated that functionality of the process flows illustrated in FIGS. 6-10 may be implemented in software whereby elements of embodiments of the present invention are essentially code segments operable upon a processor-based or computer system (e.g., clients 108, 110 and/or data storage systems 102, 104) to perform tasks as described herein. The program or code segments can be stored in a computer readable medium (e.g., RAM, ROM, disk memory, optical memory, flash memory, etc.).

Figure 6:
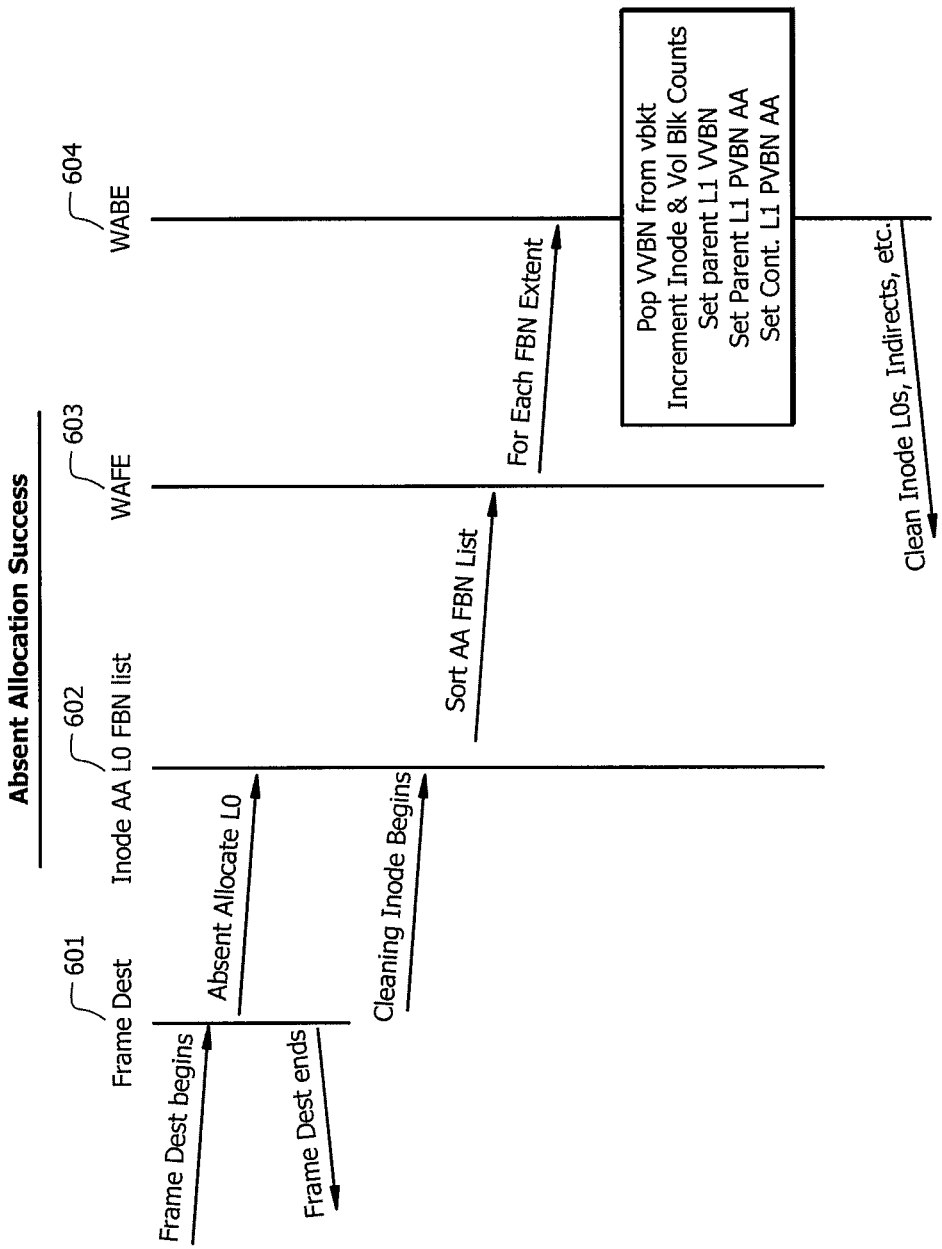
FIGS. 6-10 show various operational cases providing absent allocation techniques according to embodiments of the invention.
Figure 7:
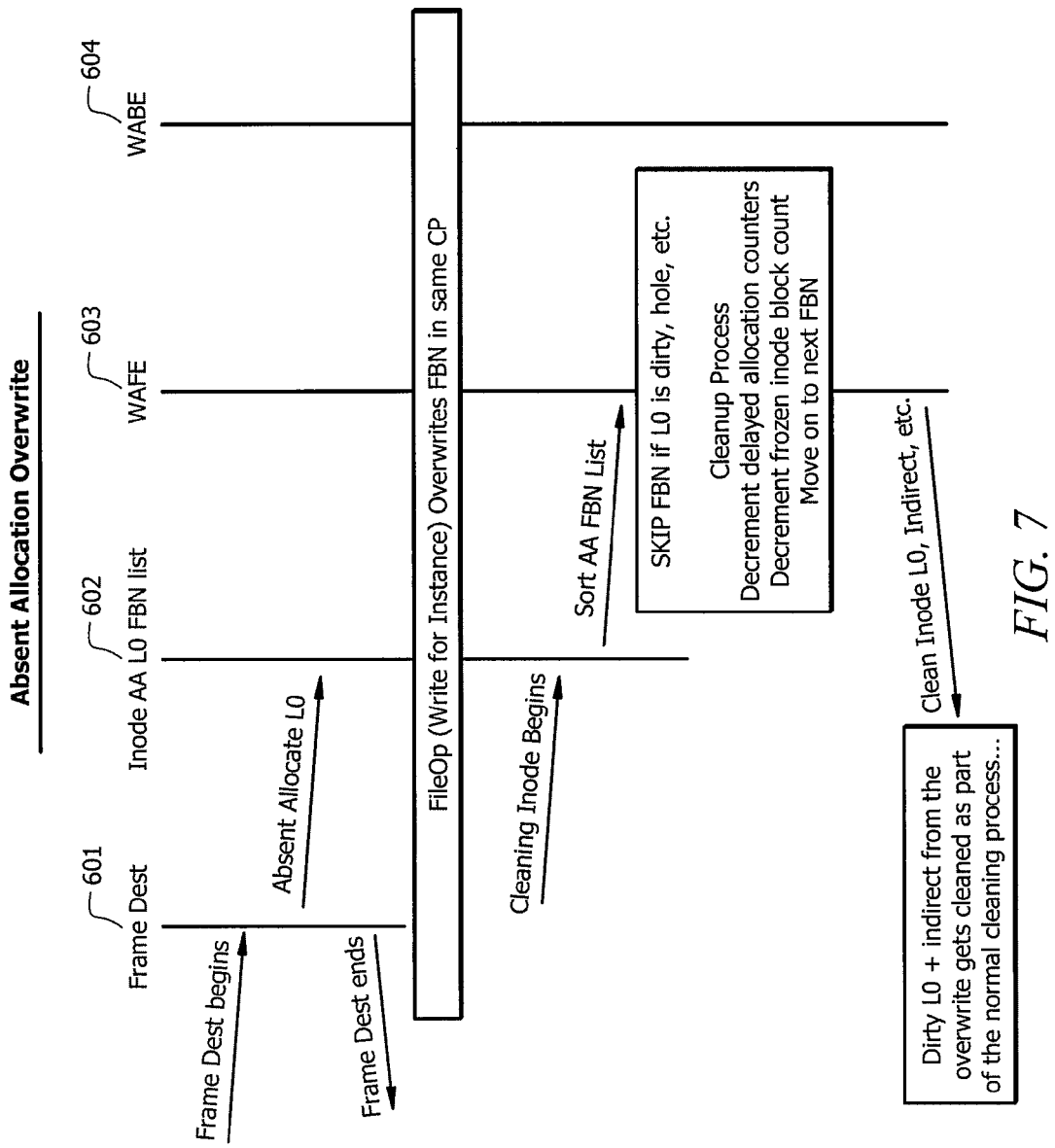

Frame Dest 601 shown in the ladder diagrams of FIGS. 6 and 7 is a process that establishes logical mapping (e.g., establishes a buffer tree), thus framing builds up a data block logical map. Inode AA L0 FBN list 602 shown in the ladder diagrams of FIGS. 6 and 7 is a data set that represents a particular data structure (e.g., file, folder, data volume, etc.), wherein for every data structure a list of the level 0 (L0) frame block numbers (FBNs) that have been absent allocated in memory is provided. WAFE (write allocation front end) 603 and WABE (write allocation back end) 604 shown in FIGS. 6 and 7 provide two portions of a cleaner process operable to taking dirty, in memory data and commit that data to a data store, wherein the cleaning process allocates spots for all the different data blocks that have been dirtied.

FIG. 6 shows an operational case where an absent allocation technique proceeds normally without any competing events according to an embodiment herein. In the embodiment of FIG. 6, the framing process begins and Frame Dest 601 generates absent allocation state indicators for absent data blocks. In particular, Frame Dest 601 of the illustrated embodiment absent allocates a L0 block in Inode AA L0 FBN list 602 for each absent data block of a data structure. That is, a zeroest level block, referring to the actual user data, is absent allocated in the hierarchical, indirect logical mapping of the buffer tree. It should be appreciated that since the buffer tree is being built, other block levels (e.g., L1, L2, L3, etc.) of the hierarchy can be fully allocated in that both a VBN and PBN may be provided because the indirect data (e.g., block pointers) may actually be stored in these levels. After absent allocation state indicators for the absent data blocks have been generated, the framing process ends.

In the embodiment illustrated in FIG. 6, a cleaning process runs independently of (e.g., in parallel with) the foregoing framing process to clean the various Inodes of the filesystem. Accordingly, at some point the cleaning process will begin with respect to Inode AA L0 FBN list 602 providing the data set that represents a particular data structure with absent data blocks absent allocated at the L0 level. For a particular Inode that has absent allocated blocks (here Inode AA L0 FBN list 602), the absent allocated list is sorted by WAFE 603 in order to lay out the absent allocated blocks in a contiguous space on the data store, such as for performance reasons. An extent of the contiguous blocks is preferably created from the sorted absent allocated blocks (e.g., providing a contiguous range) by WAFE 603.

The extents are provided to WABE 604 of the illustrated embodiment to identify areas of contiguous free data store spaces (referred to as buckets) and match those spaces up with data to be written to data store. For example, buckets of free VBNs (vbkt) and PBNs (pbkt) may be accessed by WABE 604 for assigning to particular data blocks (e.g., FBNs). VBNs and PBNs may be selected from corresponding ones of the aforementioned VBN buckets and PBN buckets and matched with the data blocks to be allocated. For example, WABE 604 retrieves a VBN from the VBN bucket for an absent allocated data block and now that particular FBN has a VBN. The Inode and volume block counts are incremented by WABE 604 of the illustrated embodiment to provide accounting information that tracks how many blocks are used by the file and volume.

WABE 604 of the illustrated embodiment further sets the parent L1 VBN so that the index in the parent L1 level of the hierarchical logical mapping is set to the VBN selected for the FBN, thereby recording the VBN in the Inode AA L0 FBN list 602 buffer tree. Additionally, WABE 604 sets the parent L1 PBN to an absent allocated state indicator. For example, a reserved PBN may be recorded in the PBN in the mode AA L0 FBN list 602 buffer tree for the FBN. Accordingly, operation of WABE 604 of the illustrated embodiment sets the parent L1 PBN to the absent allocated state. Similarly, WABE 604 sets the container L1 PBN to the absent allocated state using the absent allocated state indicator. Once WABE 604 finishes this process with respect to the blocks of Inode AA L0 FBN list 602 the absent allocated process is complete as to the present data and the normal cleaning process is performed with respect to all the data (both absent allocated and present data blocks).

FIG. 7 shows an operational case where a competing operation overwrites a FBN which is identified as absent allocated by an absent allocation technique according to an embodiment herein. It should be appreciated that operation in accordance with the ladder diagram of FIG. 7 is, at many parts, substantially the same as that of FIG. 6. However, after the framing process begins and Frame Dest 601 generates absent allocation state indicators for absent data blocks, another process overwrites an FBN that was to be absent allocated by the cleaning process. Accordingly, the data that was to be marked as absent allocated is now present. Absent allocation techniques of embodiments herein are operable to provide absent allocation state information when data is absent, and thus when an FBN that was to be absent allocated is overwritten with its data, it becomes fully allocated and the buffer tree for that data block is in its normal state (i.e., not absent allocated or absent). Declaring a FBN to be absent allocated according to embodiments only needs the FBN to be allocated in the buffer tree at a minimum. If an overwrite occurs, the overwrite is going beyond mere allocation of the FBN in the buffer tree and therefore such overwriting satisfies the absent allocation declaration. Thus, when the cleaning of Mode AA L0 FBN list 602 begins, WAFE 603 sorts the absent allocated list (as discussed above) and analyzes the list to determine if any of the absent allocated blocks are dirty (i.e., have been changed since the framing process). WAFE 603 does not include dirty FBNs in extents provided to WABE 604 for absent allocation VBN and PBN assignment. Instead, WAFE 603 increments the accounting information and moves on to the next FBN for absent allocation processing and thereafter the normal cleaning process is performed with respect to all the data (both absent allocated and present data blocks).

Figure 8:
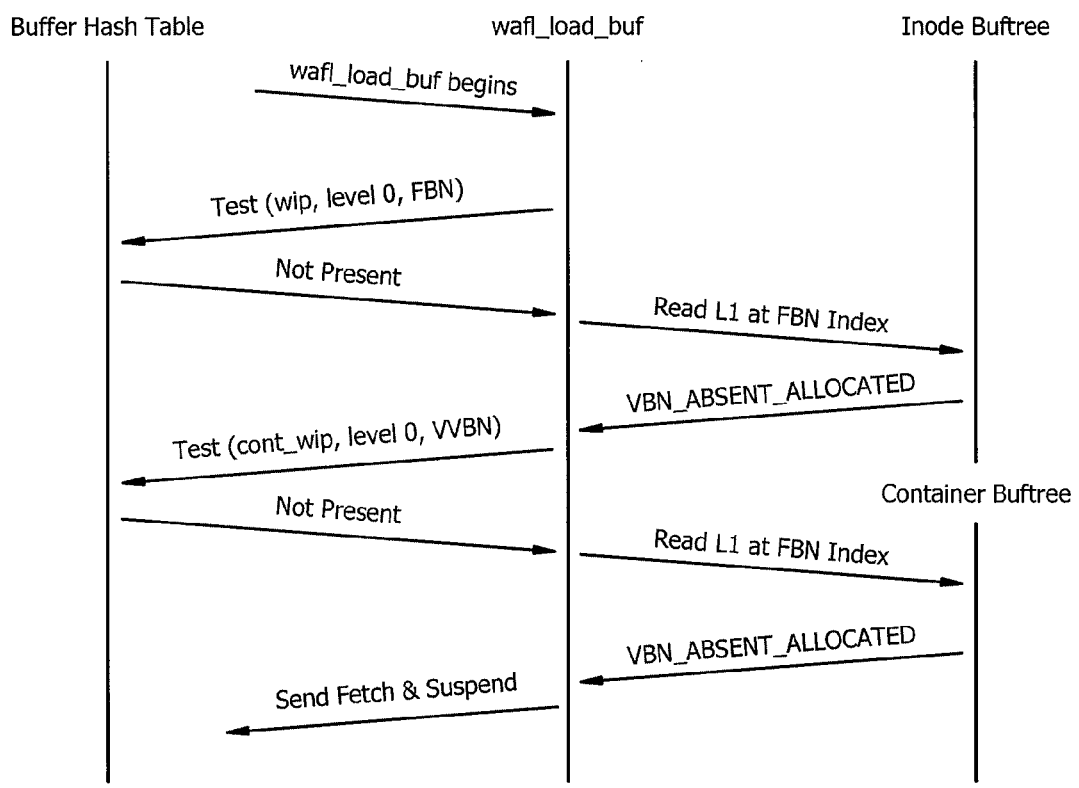

FIG. 8 shows an operational case wherein a load buffer process is attempted for a buffer that has been absent allocated and never (or not yet) filled. Operation in accordance with the ladder diagram of FIG. 8 recognizes the absent allocated and still absent state, triggers a fetch, and suspends the calling operation until the fetch returns the data from the source and fills the absent data blocks. Accordingly, in the situation illustrated in FIG. 8 a data block has been absent allocated and the data block has not been fetched from the source. The destination, therefore, has absent allocated data blocks and the source has the data blocks that are needed.

In the illustrated embodiment of FIG. 8, a WAFL load buffer process begins for an absent allocated, still absent data block (e.g., a user may have initiated an operation to read the data block at the particular FBN which is absent allocated). Because the data block remains absent (is not on the data store), the process of FIG. 8 is divided into two major steps. There is a fetch step, wherein a request is sent to the source node in order to obtain the data block. Also, there is a fill step, wherein the received data block is inserted into the destination filesystem (e.g., into the container map in the aggregate). Accordingly, the ladder diagram of FIG. 8 illustrates the substeps involved in providing the aforementioned fetch and fill steps for an absent allocated data block which is fully absent.

Because the data block may not be in the data store, but rather may be in memory prior to being committed to the data store, the process of FIG. 8 determines if the data block is in the buffer hash table after the load buffer process begins. The buffer hash table is the in-memory state of all the buffers that are present in memory and is keyed by indirect level (e.g., L0, L1, L2, etc.). Accordingly, the buffer hash table is tested at level 0 (L0) for the FBN of the data block (Test (wip, level 0, FBN)). Here the data block is absent and thus a not present indication is returned. Accordingly, the process of FIG. 8 proceeds to test the Inode buffer tree for the data block (Read L1 at FBN Index). Here, level 1 (L1) in the Inode buffer tree is read at a particular FBN index because, according to absent allocated embodiments herein each L1 has an array of VBNs and PBNs wherein a PBN of an absent allocated data block provides absent allocated information (e.g., a reserved PBN). Again, here the data block is absent and thus an absent allocated state (VBN_ABSENT_ALLOCATED) is returned. However, there is a possibility that the data block may have already been fetched and filled, and thus the process of FIG.

8 also proceeds to test the container map (Read L1 at FBN Index). Because this example situation is assumed to be an absent allocated, still absent situation, the data block is still absent and thus an absent allocated state (VBN_AB-SENT_ALLOCATED) is again returned. Thus a fetch and suspend process is initiated to retrieve the absent data block from the source. It should be appreciated that, as discussed above, the substeps of the embodiment of FIG. 8 test both the Inode inside the data structure (e.g., Read L1 at FBN Index; VBN_ABSENT_ALLOCATED) and inside the container map (e.g., Read L1 at FBN Index; VBN_ABSENT_ALLOCATED), wherein the container map is in the aggregate.

Figure 9:
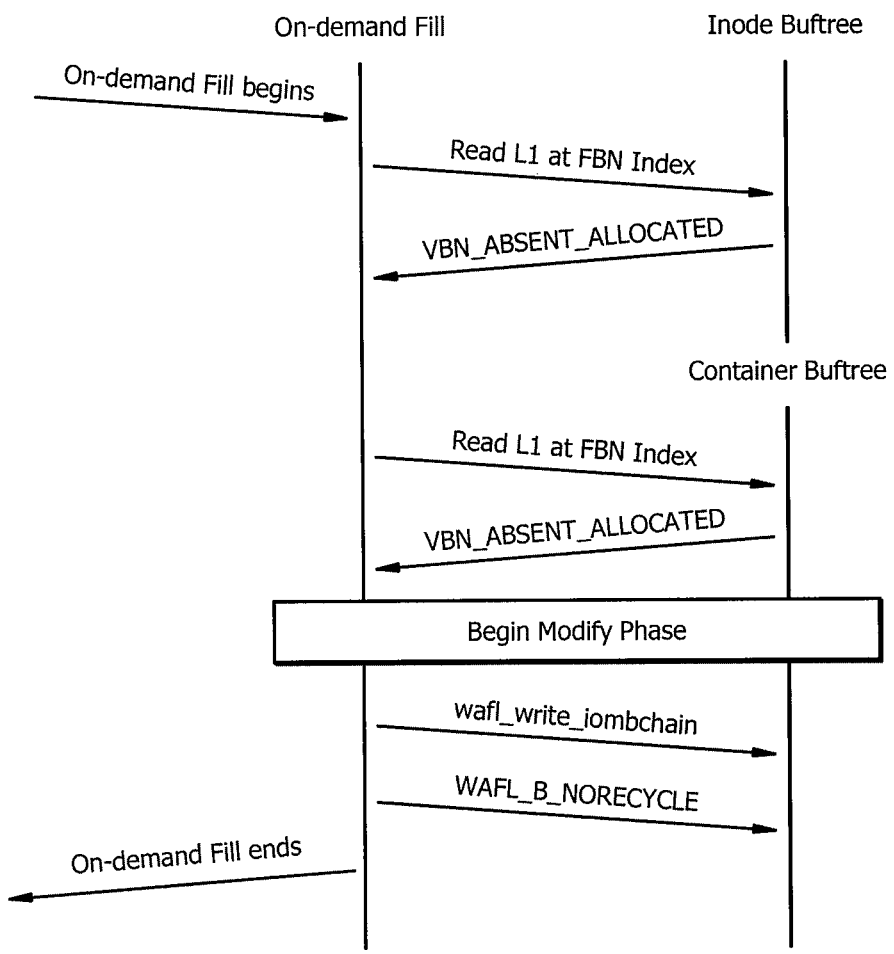

FIG. 9 shows an operational case wherein an absent allocation data block is filled in core by adding NORECYCLE buffers to the container map. The process of FIG. 9 illustrates what is done after a fetch has been performed, the data block has been returned from the source, and the data block is being written to data store at the destination according to embodiments of the invention. An on-demand fill begins which initiates the process of FIG. 9, and thus a check is made to determine if the data block is absent from the Inode buffer tree (Read L1 at FBN Index). The data block remains absent in the illustrated embodiment so an absent allocated indication is returned (VBN_ABSENT_ALLOCATED). Accordingly, the process proceeds to check the container map according to embodiments herein (Read L1 at FBN Index). Again, the data block is absent so an absent allocated indication is returned (VBN_ABSENT_ALLCATED).

Having found that the data block remains absent in the destination filesystem, the process of FIG. 9 proceeds to a modify phase. In the modify phase of the illustrated embodiment two different write processes are implemented. One such write process (wafl_write_iombchain) dirties buffers with the data of a network stack (e.g., Mbuffer chain) so that those dirty buffers will eventually be committed to data store by the cleaner process. The other such write process (WAFL_B_NORECYCLE) implements a NORECYCLE process with respect to the buffers of the container map to which the fetched data block is to be written. Since the cleaner process is a parallel system, the buffers of the container map are not dirtied while the cleaner could be dirtying buffers to the container file. Accordingly, the process of FIG. 9 marks them NORECYCLE since they are not dirty yet and the buffer cache should not recycle them because that would mean throwing away data blocks that have not been committed to data store yet. This write process preferably finishes the fill and then initiates a fill sink process, wherein the fill sink process suspends behind the cleaner if the cleaner is processing the container file. If the cleaner is not processing the container file then the write process may simply dirty the appropriate buffers and then those blocks are on their way to data store through the normal cleaning process.

Figure 10:
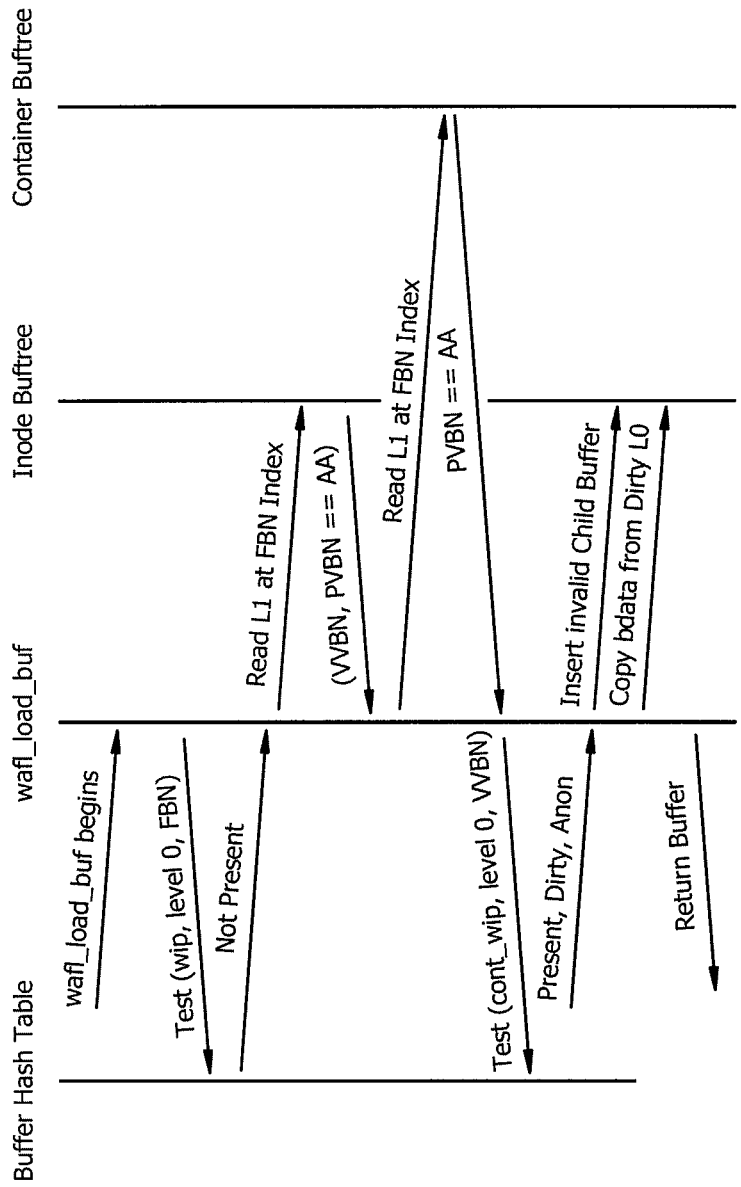

FIG. 10 shows an operational case wherein access is attempted for a data block that has been absent allocated, filled and not yet cleaned by the cleaner. In such a situation, the buffer does not have a PBN assigned yet according to embodiments. To accommodate this, buffer data is copied into the Inode buffer tree.

The process of FIG. 10 begins similar to that of the process of FIG. 8, wherein the buffer hash table, Inode buffer tree, and container map are checked for the data block. However, after the data block is determined to be absent allocated, a check of the buffer table is made for the presence of the data block not yet having a VBN assigned to it (Test (cont_wip, level 0, VVBN)). Here the data block is present in the buffer hash table without yet having had a VBN assigned thereto (the data block is anonymous) and thus a status indicating that the container is dirty is returned (Present, Dirty, Anon). For example, the cleaner is operable asynchronously with respect to other processes which may alter the data, and thus the data block may have been migrated and the cleaner process not have run to commit the data block to data store. Accordingly, the process of FIG. 10 operates to insert an invalid child buffer and to copy the buffer data from the dirty level 0 (L0) for the data block into the Inode buffer tree, wherein the foregoing invalid state of the child buffer refers to how a file system (e.g., WAFL file system) reads blocks from slow data store devices into fast memory (e.g., the read process may begin with putting an invalid buffer in memory and then initiate a read from data store and suspend, wherein the data store read will complete in time and mark the buffer valid and the request that was waiting for the buffer can be restarted and executed). Using such an invalid child buffer, embodiments need not go to data store to validate the buffer, as the needed buffer exists in the container map, and thus the Inode's buffer may be validated by copying the data from the container map.

As can be appreciated from the foregoing, embodiments of the invention provide operation wherein a data structure (e.g., file, folder, data volume, etc.) is reported as migrated from a source to a destination while data of one or more data blocks of the data structure remain to be migrated. AA states of embodiments store absent allocated information for an absent data block of the data structure within the data structure (e.g., in the buffer tree) and external to the data structure (e.g., in the container map). The absent allocated information for the absent data block stored external to the data structure is updated according to embodiments of the invention when the data of the absent data block is subsequently migrated to the destination data store. Accordingly, when accessing data of the absent data block after the data of the absent data block has been migrated from the source to the destination the absent allocated information stored in the data structure indicates that the data of the absent data block is absent from the data structure (e.g., proving a hint or suggestion that data may be absent) and the absent allocated information stored external to the data structure does not indicate that the data of the absent data block is absent from the data structure (e.g., providing a determination that data is not absent). Thus, the same accessibility with respect to absent data as was available through the data of the source and destination data stores, without dependency between source and destination data stores and without altering the data of the process providing for data at a particular point in time, is provided with respect to data captured by PIT processes (e.g., point-in-time images, point-in-time backup, snapvalut, etc.) when a time-displaced data migration technique provides for absent data.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   initiating, by a storage management computing device, a time-displaced data migration operation to migrate data from a source data structure to a destination data structure;
   assigning, by the storage management computing device, a virtual block number for an absent data block in a logical view of the destination data structure;
   assigning, by the storage management computing device, an absent allocated indicator as a physical block number associated with the virtual block number in the logical view of the destination data structure to indicate that data of a data block of the source data structure is absent from the destination data structure, wherein the logical view of the destination data structure comprises a hierarchical logical mapping and the absent allocated indicator is stored in place of a physical block number for the absent data block at a data level of the hierarchical logical mapping; and
   providing, by the storage management computing device, contemporaneously with the absent allocated indicator, an absent data block determinative indicator that the data of the data block of the source data structure is absent from the destination data structure, wherein the absent data block determinative indicator is stored external to the destination data structure.

2. The method of claim 1, further comprising:
   capturing, by the storage management computing device, the source data structure while the data of the data block is absent from the destination data structure, wherein the captured data provides a read only copy of the source data structure representing the then existing state of the source data structure; and
   accessing, by the storage management computing device, the captured data to read data of the source data structure including data of the absent data block using the absent allocated indicator and the absent data block determinative indicator.

3. The method of claim 2, further comprising:
   writing, by the storage management computing device, the data of the absent data block to the destination data structure; and
   updating, by the storage management computing device, the absent data block determinative indicator to provide a determinative indication that the data of the absent data block is no longer absent from the destination data structure, wherein the absent allocated indicator included in the captured data remains unchanged.

4. The method of claim 1, wherein the absent allocated indicator comprises a reserved physical block number predetermined to provide an absent allocated state indicator.

5. The method of claim 1, wherein the absent allocated indicator is stored in a buffer tree of the source data structure, and wherein the absent data block determinative indicator is stored in a container map associated with the destination data structure.

6. The method of claim 1, further comprising:
   storing, by the storage management computing device, a point-in-time image of the source data structure while the data of the absent data block is absent from the source data structure, wherein the point-in-time image provides a read only copy of the source data structure representing the then existing state of the source data structure; and
   moving, by the storage management computing device, the data of the absent data block from the source location to the destination location after the point-in-time image has been stored, wherein the accessing the data of the absent data block using the absent allocated information stored in the destination data structure and the absent allocated information stored external to the destination data structure accesses the data of the absent data block as migrated to the destination location.

7. A storage management computing device comprising:
   a processor;
   a memory coupled to the processor and configured to be capable of executing programmed instructions comprising and stored in the memory to:
   initiate a time-displaced data migration operation to migrate data from a source data structure to a destination data structure;
   assign a virtual block number for an absent data block in a logical view of the destination data structure;
   assign an absent allocated indicator stored as a physical block number for the absent data block in the logical view of the destination data structure, wherein the logical view of the destination data structure comprises a hierarchical logical mapping and the absent allocated indicator is stored in place of a physical block number for the absent data block at a data level of the hierarchical logical mapping; and
   provide, contemporaneously with the absent allocated indicator, a logical mapping of the destination data structure, wherein the logical mapping of the destination data structure comprises an absent data block determinative indicator that the data of the data block of the source data structure is absent from the destination data structure, wherein the absent data block determinative indicator is stored external to the destination data structure.

8. The device of claim 7, wherein the absent allocated indicator comprises a reserved physical block number predetermined to provide an absent allocated state indicator.

9. A non-transitory computer readable medium having stored thereon instructions for management of data comprising machine executable code which when executed by at least one processor causes the processor to perform steps comprising:
   initiating a time-displaced data migration operation to migrate data from a source data structure to a destination data structure;
   assigning, by the storage management computing device, a virtual block number for an absent data block in a logical view of the destination data structure;
   assigning, by the storage management computing device, an absent allocated indicator as a physical block number associated with the virtual block number in the logical view of the destination data structure to indicate that data of a data block of the source data structure is absent from the destination data structure, wherein the logical view of the destination data structure comprises a hierarchical logical mapping and the absent allocated indicator is stored in place of a physical block number for the absent data block at a data level of the hierarchical logical mapping; and
   providing, contemporaneously with the stored absent allocated indicator, an absent data block determinative indicator that the data of the data block of the source data structure is absent from the destination data structure, wherein the absent data block determinative is stored external to the destination data structure.

10. The medium of claim 9, further having stored thereon instructions that when executed by the processor cause the processor to perform steps further comprising:

capturing the source data structure when the data of the data block is absent from the source data structure, wherein the captured data provides a read only copy of the source data structure representing the then existing state of the source data structure; and accessing the captured data to read data of the source data structure including data of the absent data block using the absent allocated indicator and the absent data block determinative indicator, wherein the accessing the captured data to read data of the absent data block comprises:

accessing the absent allocated indicator within the destination data structure to provide a suggestive determination that the data of the absent data block is absent from the source data structure; and accessing the absent data block determinative indicator external to the destination data structure to provide an determinative determination that the data of the absent data block is absent from the source data structure.

11. The medium of claim 9, further having stored thereon instructions that when executed by the processor cause the processor to perform steps further comprising:

assigning an absent allocated indicator as a physical block number for storing in the destination data structure as the suggestive indication that data of the data block of the source data structure is absent from the destination data structure; and assigning the absent allocated indicator as a physical block number for storing external to the destination data structure as the determinative indication that data of the data block of the destination data structure is absent from the source structure.

12. The medium of claim 10, further having stored thereon instructions that when executed by the processor cause the processor to perform steps further comprising:

writing the data of the absent data block to the destination data structure; and updating the absent data block determinative indicator to provide a determinative indication that the data of the absent data block is no longer absent from the destination data structure, wherein the absent allocated indicator included in the captured data remains unchanged.

13. The medium of claim 11, wherein the absent allocated indicator comprises a reserved physical block number predetermined to provide an absent allocated state indicator.

14. The medium of claim 9, wherein the absent allocated indicator is stored in a buffer tree of the source data structure, and wherein the absent data block determinative indicator is stored in a container map associated with the destination data structure.

15. The medium of claim 9, further having stored thereon instructions that when executed by the processor cause the processor to perform steps further comprising:

storing a point-in-time image of the source data structure while the data of the absent data block is absent from the source data structure, wherein the point-in-time image provides a read only copy of the source data structure representing the then existing state of the source data structure; and moving the data of the absent data block from the source location to the destination location after the point-in-time image has been stored, wherein the accessing the data of the absent data block using the absent allocated information stored in the destination data structure and the absent allocated information stored external to the destination data structure accesses the data of the absent data block as migrated to the destination location.

16. The device of claim 7, wherein the processor is further configured to be capable of executing programmed instructions comprising and stored in the memory to:

capture the source data structure while the data of the data block is absent from the destination data structure, wherein the captured data provides a read only copy of the source data structure representing the then existing state of the source data structure; and access the captured data to read data of the source data structure including data of the absent data block using the absent allocated indicator and the absent data block determinative indicator.

17. The device of claim 16, wherein the processor is further configured to be capable of executing programmed instructions comprising and stored in the memory to:

write the data of the absent data block to the destination data structure; and update the absent data block determinative indicator to provide a determinative indication that the data of the absent data block is no longer absent from the destination data structure, wherein the absent allocated indicator included in the captured data remains unchanged.

18. The device of claim 7, wherein the absent allocated indicator is stored in a buffer tree of the source data structure, and wherein the absent data block determinative indicator is stored in a container map associated with the destination data structure.

19. The device of claim 7, wherein the processor is further configured to be capable of executing programmed instructions comprising and stored in the memory to:

store a point-in-time image of the source data structure while the data of the absent data block is absent from the source data structure, wherein the point-in-time image provides a read only copy of the source data structure representing the then existing state of the source data structure; and move the data of the absent data block from the source location to the destination location after the point-in-time image has been stored, wherein the accessing the data of the absent data block using the absent allocated information stored in the destination data structure and the absent allocated information stored external to the destination data structure accesses the data of the absent data block as migrated to the destination location.

* * * * *